May 31, 1949.  H. W. JOHNS  2,471,874
DUMP CAR
Filed Aug. 22, 1945  2 Sheets-Sheet 1
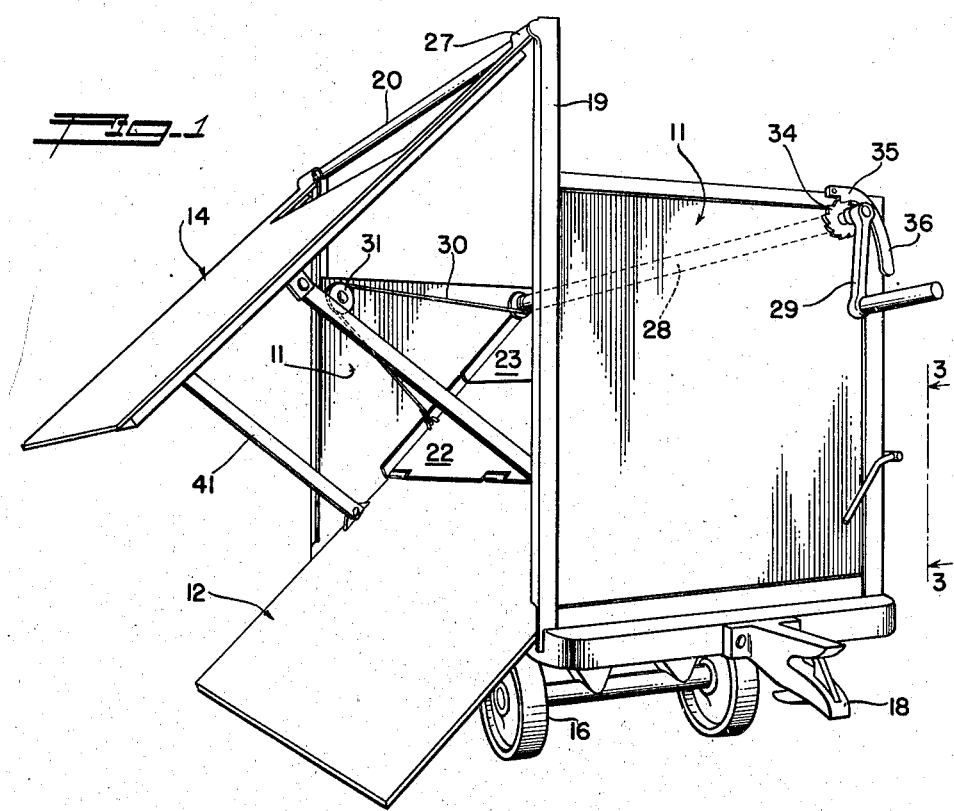
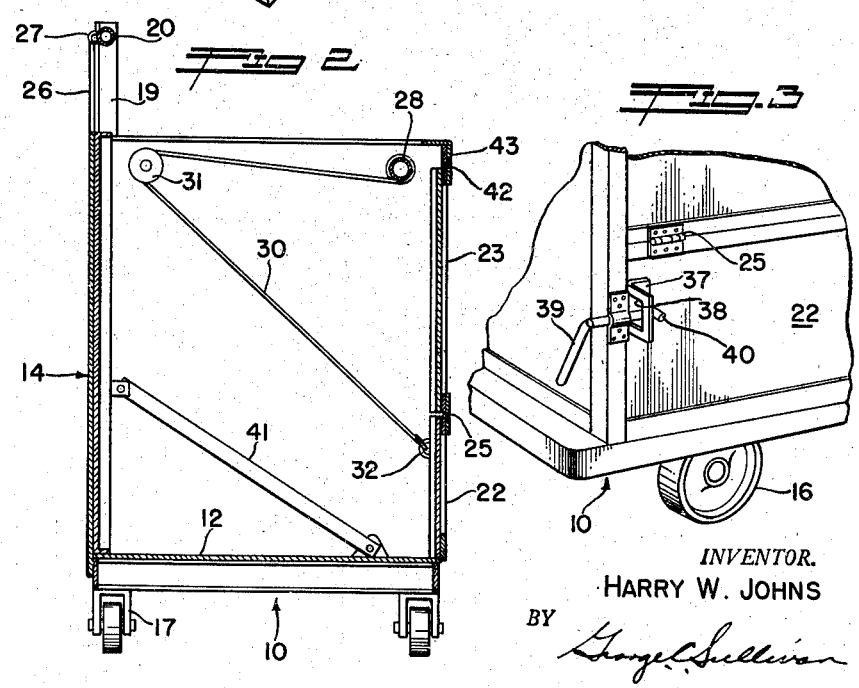
INVENTOR.
HARRY W. JOHNS
BY
George C. Sullivan
Agent

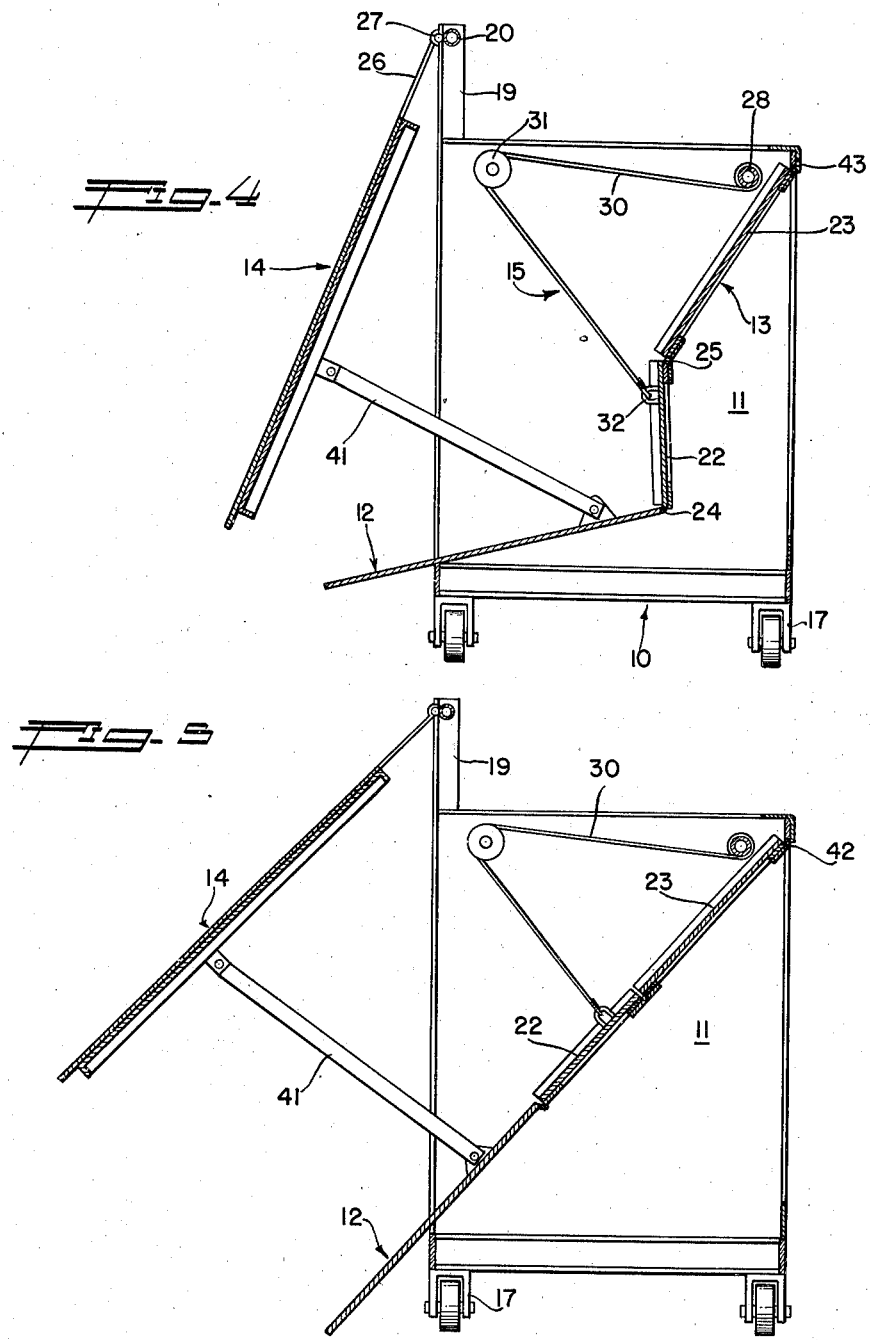

Patented May 31, 1949

2,471,874

UNITED STATES PATENT OFFICE 2,471,874

DUMP CAR

Harry W. Johns, Beverly Hills, Calif., assignor to Lockheed Aircraft Corporation, Burbank, Calif.

Application August 22, 1945, Serial No. 611,943

5 Claims. (Cl. 298—26)

This invention relates to material handling vehicles, and relates more particularly to dump cars, and the like. A general object of the invention is to provide a practical and effective dump car embodying improved means for effecting the discharge of the material from the car.

Dump vehicles of various types have been introduced, designed to facilitate the discharge of the contained material. The majority of these vehicles are in the form of mine cars, railway cars, heavy automotive trucks, etc., and require complicated expensive operating mechanisms. Trackless trains made up of relatively small lightweight cars have gone into extensive use in many industries and are employed to transport small parts, produce, refuse, etc. However, so far as I am aware, no practical dump cars have been introduced for use in these trackless trains.

It is therefore, an object of this invention to provide a car or vehicle suitable for use in trackless trains, and in similar situations, which embodies a simple, inexpensive light-weight means for discharging the load or material at will.

It is another object of the invention to provide a dump car of the character referred to in which simple manual operation of a hand crank serves to completely discharge the material from the car. In the car of the present invention, one side is hinged to swing open, and the bottom and the other side are arranged and articulated to move to positions in a common inclined plane so that the material is caused to fall or discharge through the open side of the car. These coordinated motions of the two sides and bottom are effected by simple hand crank operation.

A further object of the invention is to provide a car of the character referred to in which the side that is hinged to the car bottom is itself articulated, and comprises a lower section which moves forwardly during the initial phase of the operation to displace the lower portion of the load, and thus assist in tipping the bottom and in bringing about the complete discharge of the material. The hinged side further includes an upper section which swings to the unloading position during the final major portion of the operation to eject the remaining upper part of the load.

A still further object of the invention is to provide a dump car that is self closing, being adapted to return to the condition where the sides are vertical and the bottom is horizontal. Little or no manual exertion is required to condition the car for the reception of a new load of material.

Other objectives and features of the invention will be readily understood from the following detailed description of a typical preferred form of the invention wherein reference will be made to the accompanying drawings in which:

Figure 1 is a perspective view of the car provided by this invention shown in the material-discharging condition;

Figure 2 is a vertical sectional view of the car in the normal condition;

Figure 3 is a fragmentary perspective view taken substantially as indicated by line 3—3 on Figure 1;

Figure 4 is a view similar to Figure 3 showing the parts in the partially operated positions; and Figure 5 is a view similar to Figure 3 with the parts in the fully operated positions.

The car of this invention may be said to comprise generally a wheeled base or frame 10, fixed ends 11, a tiltable bottom 12, an articulated side 13, a swingable side 14, and means 15 for moving or operating the bottom 12 and sides 13 and 14 to discharge the contained material.

In accordance with the invention, any selected or required form of base may be employed. In the drawings there is shown a simple rectangular base frame 10 equipped at its forward end with a pair of wheels 16, and at its rear end with a pair of castered wheels 17. It is to be understood that all of the several wheels may be castered, or may be flanged for use on a track, or may be provided with rubber tires as required. The frame 10 is further provided with suitable hitches or couplings 18 to facilitate its attachment in a train.

The two ends 11 are fixed rigid members projecting vertically from adjacent the forward and rearward extremities of the base frame 10. The ends 11 may be constructed of sheet or plate stock carried in rectangular frames. A post 19 projects upwardly from what may be considered the forward upper corner of each end 11. The posts 19 serve to carry the swinging side 14, as will be later described. A horizontal rod 20 extends between and connects the upper ends of the posts 19 to reinforce the structure.

The bottom 12 may be a simple, flat, rectangular member, and normally occupies a horizontal position immediately above the base frame 10. The car bottom is proportioned so that it may be moved or tilted in the space between the ends 11. It is to be observed that the bottom 12 serves to support the material or load, and that there is no necessity for an additional bottom element for the car.

The side 13 is a rectangular structure or assembly that normally occupies a vertical position as shown in Figure 2, where it extends between the two upright ends 11. In accordance with the invention, the side 13 includes a lower section 22 and an upper section 23. The lower section 22 is pivotally or hingedly connected with one edge of the bottom 12 by hinges 24 or the equivalent. The upper section 23 is, in turn, hinged to the upper edge of the lower section 22 by hinges 25. It is preferred that the upper section 23 be somewhat wider than the lower section 22 as illustrated throughout the drawings. Hinges 42 secure the upper edge of the section 23 to a bar 43 extending between the ends 11. The side 13 is approximately the same height as the ends 11.

The side 14 may be a simple, rectangular part, and is normally in a vertical position where its lower portion engages one side of the base frame 10, and where its vertical edge parts cooperate with the edges of the two ends 11. Arms 26 project from the upper corners of the side 14, and are pivotally secured to the posts 19 at 27 so that the side may swing about a horizontal axis spaced above the car sides and ends.

The means 15 is operable to move the bottom 12 and sides 13 and 14 from the normal positions illustrated in Figure 2 to the material-discharging positions of Figure 5. The means 15 includes links 41 extending between and connecting the bottom 12 and the side 14. The links 41 are pivotally secured to suitable lugs adjacent the ends of the bottom and side 14. As will be later described, the links 41 serve to transmit movement between the bottom 12 and the side 14. The operating means 15 further includes a horizontal shaft 28 suitably supported on the upper rear corners of the ends 11 and provided at one extremity with a suitable hand crank 29. It will be observed that the shaft 28 is in a position where it does not interfere with the filling or emptying of the car. A flexible element 30 in the form of a cable, or the like, is secured to the shaft 28 adjacent one end 11 and has several turns wrapped about the shaft. The cable 30 extends forwardly to a direction-changing pulley 31 suitably journaled on the upper forward corner of the adjacent car end 11. The cable 30 then passes downwardly and rearwardly to an attaching eye or loop 32 on the lower section 22 of the car side 13. While I have shown only one cable 30, it will be apparent that a second cable may be arranged in a similar manner adjacent the other end of the car to provide for a balanced operation.

Ratchet means is provided to releasably retain the car parts in any selected operated or partially operated position. A ratchet wheel 34 is fixed to the shaft 28 at one car end 11 and a pawl 35 is pivoted to said end to cooperate with the wheel. The pawl 35 has a handle 36 so that it may be swung between the position where it cooperates with the ratchet teeth and a position where it permits free rotation of the shaft in both directions.

The car bottom 12 and sides 13 and 14 tend to remain in their normal positions illustrated in Figure 2, until interfered with. However, it may be preferred to provide means for retaining these parts in their normal positions. In Figure 3 there is illustrated a keeper 37 attached to the above described section 22 and provided with an opening 38. A shiftable and turnable latch or bolt 39 is mounted on the adjacent car end 11. The bolt 39 is adapted to be shifted to a position where it extends through the keeper opening 38 and has a lateral latch head 40 for cooperating with the keeper. The bolt 39 engaged in the keeper 37 dependably retains the movable bottom and sides in their normal positions.

Assuming that the car contains material to be dumped, the operator turns and shifts the bolt 39 to disengage it from the keeper 37. The hand crank 29 is then operated to rotate the shaft 28 and causes the cable 30 to be spooled onto the shaft. During the first portion of this rotation of the crank 29, the cable 30 pulls the section 22 forwardly and upwardly to a position such as shown in Figure 4. Simultaneously with this movement, the bottom 12 is brought to an inclined position and the side 14 is swung forwardly. The forward motion of the section 22 displaces the lower layer or stratum of the load in a forward direction, tending to shift the center of gravity of the load and thus assist in the further operation of the car parts, and serving to loosen the entire load for free ejection. Continued rotation of the crank 29 brings the parts to the positions illustrated in Figure 5 where the bottom 12 and the side 13 occupy a common inclined plane, and the side 14 occupies an inclined plane. It will be seen that with the parts in the position of Figure 5, the entire contents of the car will freely discharge. It will be noted that the side 14 is slightly divergent with respect to the bottom 12 and side 13 to allow the unrestricted dumping of the material. The pawl 35 engaging the ratchet 34, retains the parts in the material-discharging positions. To condition the car for further use, the pawl 35 is released, allowing the bottom 12 and sides 13 and 14 to swing back to their normal positions. The parts may return to the normal positions by gravity. However, if necessary, the operator may push on the side 14 or pull on the side 13 to facilitate the closing operations. The latch bolt 39 may be manipulated to cooperate with the keeper 37 for the purpose of retaining the parts in the normal positions.

Having described only a typical form of the invention, I do not wish to be limited to the specific details herein set forth, but wish to reserve to myself any variations or modifications that may appear to those skilled in the art or fall within the scope of the following claims.

I claim:

1. A dump car comprising spaced end walls, spaced front and rear side walls, the front side wall being supported from its upper end for outward swinging, the rear side wall including an upper section supported from its upper end for swinging in the same direction as the front side wall, and a lower section hingedly connected with the lower edge of the upper section, a bottom wall hingedly connected with the lower edge of said lower section, said walls defining a material containing compartment, link means connecting the front side wall and the bottom wall, the link means being of sufficient length to swing the front wall to a position in forwardly divergent relation to the bottom wall when the bottom wall is moved forwardly, and means for swinging said rear wall forwardly so that said rear wall and the bottom wall are brought to positions in a common inclined plane and the front side wall is swung forwardly to a position in generally parallel relation to said plane.

2. A dump car comprising spaced end walls, spaced front and rear side walls, the front side wall being supported from its upper end for outward swinging, the rear side wall including an upper section supported from its upper end for swinging in the same direction as the front side wall, and a lower section hingedly connected with the lower edge of the upper section, a bottom wall hingedly connected at its rear edge with the lower edge of said lower section, the forward edge of the bottom wall being unsecured and adapted for forward projection from the frame, said walls defining a material containing compartment, link means connecting the front side wall and the bottom wall, the link means being of sufficient length to swing the front wall to a position in forwardly divergent relation to the bottom wall when the bottom wall is moved forwardly, and means for acting on said lower section to move the same forwardly and thus swing the front side wall outwardly and bodily move the bottom wall forwardly and then acting to move said sections of the rear side wall and the bottom wall to a common forwardly and downwardly inclined plane and to swing the front side wall further outwardly.

3. A dump car comprising spaced end walls, spaced front and rear side walls, the front side wall being supported from its upper end for outward swinging, the rear side wall including an upper section supported from its upper end for swinging in the same direction as the front side wall, and a lower section hingedly connected with the lower edge of the upper section, a bottom wall hingedly connected with the lower edge of said lower section, said walls defining a material containing compartment, link means connecting the front side wall and the bottom wall, the link means being related to the front side wall and the bottom wall to move the front side wall to a position in forwardly diverging relation to the bottom wall when the latter is moved forwardly, and means for swinging said rear wall forwardly so that said rear wall and the bottom wall are brought to positions in a common inclined plane and the front side wall is swung forwardly to a position in generally parallel but forwardly divergent relation to said plane, the last named means including a cable connected with said lower section of the rear side wall, and manually operable means for acting on the cable.

4. In a dump car having a wheeled frame and spaced end walls on the frame, the combination of; a front side wall supported to swing forwardly from its upper end, a rear side wall comprising an upper section hinged from its upper end to swing forwardly, and a lower section hinged to the upper section, a bottom wall hinged at its rear edge to the lower section and normally occupying a horizontal position immediately above the frame, the forward edge of the bottom being unsecured and adapted for projection beyond the frame, and means for first moving said lower section forwardly to bodily shift the bottom wall forwardly and project it forwardly from the frame and for then moving said sections and bottom to positions where they occupy a common downwardly and forwardly inclined plane, said means including an operating element attached to said lower section, and means for acting forwardly on said element.

5. In a dump car having a wheeled frame and spaced end walls on the frame, the combination of; a front side wall supported to swing forwardly from its upper end about an axis spaced above the said end walls, a rear side wall comprising an upper section hinged from its upper end to swing forwardly, and a lower section hinged to the upper section, a bottom wall hinged at its rear edge to the lower section and normally occupying a horizontal position immediately above the frame, the forward edge of the bottom wall being unsecured and adapted for projection beyond the frame, means for first moving said lower section forwardly to bodily shift the bottom wall forwardly and project it from the frame and for then moving said sections and bottom to positions where they occupy a common downwardly and forwardly inclined plane, and link means connecting the front side wall with the bottom wall to swing the front side wall forwardly as the bottom wall is shifted forwardly, the length of the link means and the location of said axis being related to cause the front side wall to assume a position in forwardly diverging relation to the bottom wall when the latter is shifted forwardly and projected from the frame.

HARRY W. JOHNS.

REFERENCES CITED

The following references are of record in the file of this patent:

UNITED STATES PATENTS

| Number | Name | Date |
| --- | --- | --- |
| 1,030,884 | Ganey | July 2, 1912 |
| 1,279,089 | Dolbear | Sept. 17, 1918 |
| 1,897,175 | Meyer | Feb. 14, 1933 |
| 2,284,661 | Joy | June 2, 1942 |